United States Patent Office 3,560,522
Patented Feb. 2, 1971

3,560,522
SPIRO[1,3-BENZODIOXOL-2,3'-PYRROLIDINE] AND INTERMEDIATES THEREFOR
John Gmunder, Muttenz, Switzerland, and Richard Berthold, Reinach, Basel-Land, Switzerland, assignors to Sandoz Ltd., Basel, Switzerland
No Drawing. Filed Jan. 15, 1969, Ser. No. 791,509
Claims priority, application Switzerland, Jan. 24, 1968, 1,118/68; Apr. 8, 1968, 5,192/68; May 29, 1968, 7,961/68
Int. Cl. C07d *13/10, 27/04, 27/10*
U.S. Cl. 260—326.5      3 Claims

ABSTRACT OF THE DISCLOSURE

The invention concerns spiro[1,3-benzodioxol-2,3'-pyrrolidine] of the formula:

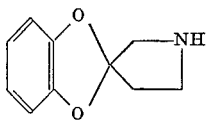

and pharmaceutically acceptable acid addition salts thereof. Processes for preparing the above compound and salts are also described and the invention also concerns various intermediates employed in such processes. Spiro-[1,3-benzodioxol-2,3'-pyrrolidine] and pharmaceutically acceptable acid addition salts thereof are useful antidepressants.

---

The present invention relates to the hitherto unknown compound spiro[1,3 - benzodioxol - 2,3' - pyrrolidine] of Formula I,

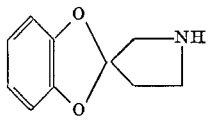

and acid addition salts thereof.

The compound of Formula I and its acid addition salts may be produced in accordance with the invention by (a) splitting off the benzyl radical from 1'-benzylspiro [1,3-benzodioxol-2,3'-pyrrolidine] of Formula II,

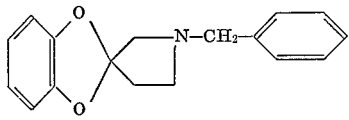

(b) or reacting compounds of Formula III,

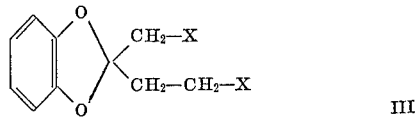

in which each of the two symbols X signifies the acid radical of a reactive ester,
in the presence of at least two mols of an acid-binding agent with ammonia, and optionally converting the resulting compound into the corresponding salts by reacting with inorganic or organic acids.

The invention is explained in detail below:

(a) The splitting off of the benzyl radical may conveniently be effected by treating the 1'-benzylspiro[1,3-benzodioxol-2,3'-pyrrolidine] of Formula II, used as starting material, with gaseous hydrogen in the presence of a suitable catalyst, e.g. palladium. Hydrogenation is effected in a suitable organic solvent (e.g. ethanol or another lower alkanol), preferably at an elevated pressure and at an elevated temperature, e.g. at a pressure of about 2 to 10 atmospheres and at a temperature of about 30–100° C. After the taking up of hydrogen is completed, working up is effected by filtering off the catalyst and concentrating the filtrate by evaporation, whereby the compound of Formula I is obtained as residue.

(b) In Formula III each of the two symbols X signifies the acid radical of a reactive ester, e.g. the methane-, ethane-, benzene- or toluene-sulphonyloxy radical, or chlorine or bromine; 2-(2-methanesulphonyloxyethyl)-2-methanesulphonyloxymethyl-1,3-benzodioxal or 2-(2-bromoethyl)-2-bromomethyl-1,3-benzodioxol may, for example, be used as starting material of Formula III. The reaction of compounds III with ammonia is effected in the presence of at least two mols of an acid-binding agent (calculated on one mol of compound III), whereby ammonia is also advantageously used for this purpose, preferably a considerable (e.g. 10- to 100-fold) excess of the same.

In accordance with a particularly advantageous method of effecting the process the ammonia is used in liquid form, so that it may at the same time be used as solvent; however, a suitable organic solvent may also be added, e.g. a lower alkanol such as ethanol. The reaction may be effected at about 70–150° C. in a pressure vessel and has a duration of about 2 to 10 hours. After the reaction is completed working up may be effected by allowing the excess ammonia and any solvent which may be present to escape or evaporate, shaking the residue with water and a water-immiscible organic solvent, e.g. chloroform, and isolating the compound of Formula I in the usual manner from the separated organic phase.

The compound I obtained as crude product may be purified in manner known per se. It is a basic compound and with inorganic and organic acids, e.g. hydrochloric, hydrobromic, methane-, benzene- or p-toluene-sulphonic acid, cyclohexylsulphamic, maleic or tartaric acid, forms stable, water-soluble salts, the production of which is also included in the present invention.

The compounds of Formulae II and III used as starting materials are new and may be produced from pyrocatechin by following the series of reactions described below:

Pyrocatechin is allowed to react in an alkaline medium with compounds of Formula IV, R—OOC—CHBr—CHBr—COO—R     (IV)

in which each of the two symbols R signifies lower alkyl of 1 to 4 carbon atoms, whereby novel benzodioxol derivatives of Formula V,

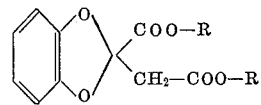

in which R has the above significance, are obtained. Meso-dibromosuccinic acid diethyl ester may, for example, be used as compound of Formula IV. The reaction may, for example, be effected in a solution or suspension of an alkali salt of a lower alkanol in the corresponding alkanol or in another suitable organic solvent, e.g. in a solution of sodium ethylate in ethanol, at room temperature or at an elevated temperature (e.g. under reflux) and has a duration of about 10 to 20 hours.

Compounds of Formula V may, however, also be obtained by reacting pyrocatechin in the presence of a catalytic amount of a basic condensation agent with compounds of Formula VI,

in which R has the above significance, e.g. with acetylene dicarboxylic acid dimethyl ester. An alkali metal hydride or an alkali salt of a lower alkanol may, for example, be used as condensation agent. The reaction is effected in an organic solvent which is inert under the reaction conditions, e.g. a lower alkanol such as methanol. The reaction is very brisk and exothermic, so that cooling is necessary in most cases. The reaction may conveniently be effected at a temperature range of about 0° to 100° C. and has a duration of a few minutes to several hours depending on the temperature.

The novel compound 2-(2-hydroxyethyl)-2-hydroxymethyl-1,3-benzodioxol of Formula VII

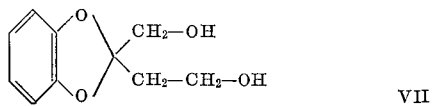

is obtained by reduction of compounds of Formula V with lithium aluminium hydride. 2-methoxycarbonyl-1,3-benzodioxol-2-acetic acid methyl ester or 2-ethoxycarbonyl-1,3-benzodioxol-2-acetic acid ethyl ester may, for example, be used as starting material of Formula V. The reduction is effected in a suitable organic solvent which is inert under the reaction conditions, e.g. an open-chain or cyclic ether such as tetrahydrofuran, at an elevated temperature (e.g. under reflux) and has a duration of about 10 to 20 hours.

Compounds of Formula III are obtained by converting 2-(2-hydroxyethyl)-2-hydroxymethyl-1,3-benzodioxol into reactive esters, e.g. by reacting with methane-, ethane-, benzene- or toluene-sulphonyl chloride in the presence of an acid-binding agent, e.g. triethylamine, in a suitable organic solvent which is inert under the reaction conditions, e.g. chloroform or methylene chloride, or by reacting with a reactive phosphorus or sulphur halide, e.g. thionyl chloride or phosphorus tribromide, in ether or in another suitable organic solvent which is inert under the reaction conditions. The reaction is preferably effected at room temperature, whereby cooling may be necessary in certain cases, and has a duration of about 3 to 20 hours.

1'-benzylspiro[1,3 - benzodioxol - 2,3' - pyrrolidine] of Formula II may be obtained by reacting a compound of Formula III, e.g. 2-(2-methanesulphonyloxyethyl)-2-methanesulphonyloxymethyl - 1,3 - benzodioxol or 2 - (2-bromoethyl)-2-bromomethyl-1,3-benzodioxol, with benzylamine. The reaction requires the presence of at least two mols of an acid-binding agent (calculated on the compound of Formula III used), whereby benzylamine is also preferably used for this purpose; in accordance with a preferred method of effecting the process the compound III is heated with a considerable (about 4- to 10-fold) excess of benzylamine to about 100–180° C. for about 1 to 10 hours.

The compound of Formula II may, however, also be obtained as follows: A compound of Formula V, e.g. 2-methoxycarbonyl-1,3-benzodioxol-2-acetic acid methyl ester or 2-ethoxycarbonyl-1,3-benzodioxol-2-acetic acid ethyl ester, is heated, preferably to 200–250° C. in a pressure vessel, with benzylamine for 1 to 10 hours, whereby 1'-benzylspiro[1,3-benzodioxol-2,3'-pyrrolidine]-2',5'-dione of Formula VIII

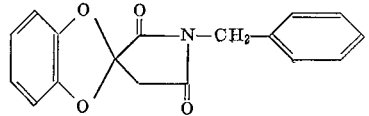

is obtained. The compound of Formula VIII is then reduced with lithium aluminium hydride. The latter reaction step is conveniently effected at an elevated temperature (e.g. under reflux) in an organic medium which is inert under the reaction conditions, e.g. benzene/ether, for about 15 to 30 hours.

The starting materials of Formulae II, III, V, VII and VIII described above also form part of the present invention.

The compound of Formula I has hitherto not been described in the literature, but is included in the general definition of a group of spiroketals which may be used as intermediates for the production of basically substituted butyrophenones.

Spiro[1,3-benzodioxol-2,3'-pyrrolidine] of Formula I and pharmaceutically acceptable acid addition salts thereof are useful because they possess pharmacological activity in animals. In particular, such compounds are useful antidepressants as indicated by a strong antagonism towards tetrabenazine-induced ptosis and catalepsy in rats, a pronounced antagonism towards the hypothermic effects of reserpine in mice, a potentiation of the excitation produced in mice by DOPA (3,4-dihydroxyphenylalanine), and also other tests suitable for determining antidepressant activity.

A special advantage of the compounds is that their effects are equally intensive whether administered perorally or parenterally. The compounds exhibit only a weak anticholinergic activity and only have a temporary effect on the cardiovascular system.

For the above-mentioned use, the dosage administered will, of course, vary depending on mode of administration and treatment desired. However, in general, satisfactory results are obtained when administered at a daily dosage of from about 0.15 to about 7 milligrams per kilogram of animal body weight, preferably given in divided doses 2 to 3 times a day or in sustained release form. For the larger mammals, the total daily dosage is in the range of from about 10 to about 500 mg., and dosage forms suitable for oral administartion comprise from about 3.3 to about 250 mg. of the compound admixed with a solid or liquid pharmaceutical carrier or diluent.

The new compound of Formula I or its water-soluble, pharmaceutically acceptable acid addition salts may be used as medicaments on their own or in the form of suitable medicinal preparations, e.g. tablets, dragées, capsules, syrups or injectable solutions for enteral or parenteral administration. Aside from the usual inorganic or organic, pharmacologically inert adjuvants, e.g., polyvinyl pyrrolidone, methyl cellulose, talc, maize starch, magnesium stearate, stearic acid or sorbic acid, these preparations may also contain suitable preserving agents, sweetening and colouring substances and flavourings.

In the following non-limitative examples all temperatures are indicated in degrees centigrade and are uncorrected.

EXAMPLE 1

Spiro[1,3-benzodioxol-2,3'-pyrrolidine] (reaction a)

71 g. of 1' - benxylspiro[1,3 - benzodioxol - 2,3'-pyrrolidine], dissolved in 150 cc. of ethanol, are hydrogenated in the presence of 7 g. of a palladium catalyst (10% on charcoal) at 50° and a pressure of 5 atmospheres. After the taking up of hydrogen is completed the catalyst is filtered off, the filtrate is evaporated in a vacuum and the residue is distilled in a vacuum, whereby the title compound distills over at 89–91°/0.25 mm. of Hg; its hydrochloride has a M.P. of 245–246° (after crystallization from ethanol/ether).

EXAMPLE 2

Spiro[1,3-benzodioxol-2,3'-pyrrolidine] (reaction b)

10 g. of 2 - (2 - methanesulphonyloxyethyl)-2-methanesulphonyloxymethyl - 1,3 - benzodioxol are heated to 110° in a pressure vessel for 5 hours with 50 cc. of liquid ammonia. After cooling and evaporating the excess ammonia the residue is shaken with water and chloroform; the chloroform extract is separated, dried over sodium sulphate and concentrated by evaporation. The residue is distilled in a vacuum, whereby the title compound distills over at 89–91°/0.25 mm. of Hg; its hydrochloride has a M.P. of 245–246° (after crystallization from ethanol/ether).

2 - (2 - bromoethyl) - 2-bromomethyl-1,3-benzodioxol may likewise be used as starting material in place of 2-(2-methanesulphonyloxyethyl) - 2 - methanesulphonyloxymethyl-1,3-benzodioxol.

PRODUCTION OF THE STARTING MATERIALS FOR REACTION (a)

(a) 2-ethoxycarbonyl-1,3-benzodioxol-2-acetic acid ethyl ester 124.3 g. of sodium are dissolved in 3 liters of absolute ethanol and a solution of 595 g. of pyrocatechin in 800 cc. of absolute ethanol is added while stirring during the course of 10 minutes, whereby a grey suspension results; a solution of 896 g. of mesodibromosuccinic acid diethyl ester in 2.2 liters of absolute ethanol is added dropwise to this suspension.

The mixture is stirred at 100° (bath temperature) for 16 hours, is allowed to cool, the precipitated sodium bromide is filtered off and the filtrate is concentrated by evaporation in a vacuum. The dark brown residue is taken up in 1.5 liters of ether and is shaken out 4 times with 1 liter amounts of water and 4 times with 1 liter amounts of a 2 N caustic soda solution; the ether layer is dried over sodium sulphate. After filtration and evaporation of the ether the title compound is obtained in the form of a yellow oil and is purified by distillation at 130–137° 0.15 mm. of Hg.

(b) 2-methoxycarbonyl-1,3-benzodioxol-2-acetic acid methyl ester

A spatula tip of sodium hydride is added to a solution of 14.2 g. of acetylenedicarboxylic acid dimethyl ester and 11.0 g. of pyrocatechin in 30 cc. of methanol, whereby a violent reaction commences. The temperature of the mixture is kept below 20° by cooling in an ice bath. After standing over night at room temperature the reaction mixture is distilled, whereby the title compound distills over as a slightly yellowish oil at a temperature between 160 and 170° and a pressure of 0.5 mm. of Hg.

(c) 2-(2-hydroxyethyl)-2-hydroxymethyl-1,3-benzodioxol 71 g. of lithium aluminum hydride are suspended in 2 liters of tetrahydrofuran and a solution of 150 g. of 2-ethoxycarbonyl - 1,3 - benzodioxol - 2 - acetic acid ethyl ester in 150 cc. of tetrahydrofuran is added dropwise while cooling. The mixture is heated to 80° (bath temperature) for 18 hours and water is subsequently added dropwise; the precipitate is filtered off and the filtrate is concentrated by evaporation in a vacuum, whereby a red oil is obtained as residue. This is divided between chloroform and water, whereby a chloroform extract is obtained which is dried over sodium sulphate and concentrated by evaporation in a vacuum, whereby the title compound is obtained in the form of a yellow oil; high vacuum distillation yields the title compound in the form of a colourless oil having a B.P. of 163–167°/ 0.2 mm. of Hg.

2 - methoxycarbonyl - 1,3 - benzodioxol-2-acetic acid methyl ester may likewise be used as starting material in place of 2 - ethoxycarbonyl - 1,3 - benzodioxol-2-acetic acid ethyl ester.

(d) 2-(2-methanesulphonyloxyethyl)-2-methanesulphonyloxymethyl-1,3-benzodioxol 126 g. of 2 - (2 - hydroxyethyl) - 2-hydroxymethyl-1,3-benzodioxol are dissolved in 350 cc. of chloroform, a solution of 130 g. of triethylamine in 100 cc. of chloroform is added and a solution of 142 g. of methanesulphonyl chloride in 150 cc. of chloroform is added dropwise while cooling. A further 400 cc. of chloroform are added to the solution, the solution is stirred at room temperature over night and is subsequently washed thrice with 500 cc. amounts of water. The chloroform phase is dried over sodium sulphate, is filtered and the filtrate is evaporated to dryness. The title compound is obtained as a crystalline residue which is recrystallized from ether/petroleum ether. M.P. 101–102°.

(e) 2-(2-bromoethyl)-2-bromomethyl-1,3-benzodioxol 9 g. of 2 - (2 - hydroxyethyl) - 2-hydroxymethyl-1,3-benzodioxol are dissolved in 50 cc. of absolute ether. A solution of 9.7 g. of phosphorus tribromide in 50 cc. of absolute ether is slowly added dropwise, the mixture is subsequently stirred at room temperature for 4½ hours and 50 cc. of water are then carefully added. The organic phase is separated, dried over sodium sulphate and concentrated by evaporation; the title compound is obtained in the form of a yellow oil and is directly worked up as crude product without previous purification.

(f) 1'-benzylspiro[1,3-benzodioxol-2,3'-pyrrolidine]

159 g. of 2 - (2 - methanesulphonyloxyethyl) - 2-methanesulphonyloxymethyl-1,3-benzodioxol are heated to 150° (bath temperature) for 2½ hours with 245 g. of benzylamine. The hot solution is poured on 500 cc. of water and is exhaustively extracted with chloroform. The chloroform extract is dried over sodium sulphate, is filtered, the filtrate is concentrated by evaporation in a vacuum and the oily residue is distilled in a vacuum, whereby the title compound distills over at 159–163°/0.25 mm. of Hg.

(g) 1'-benzylspiro[1,3-benzodioxol-2,3'-pyrrolidine]-2',5'-dione 50 g. of 2-ethoxycarbonyl - 1,3 - benzodioxol-2-acetic acid ethyl ester are heated to 220° in a pressure vessel for four hours with 19.1 g. of benzylamine. After cooling methanol is added and ether is added to the resulting solution until crystallization commences; 1'-benzylspiro [1,3 - benzodioxol - 2,3' - pyrrolidine]-2',5'-dione is obtained in the form of crystals having a M.P. of 136–138°.

2-methoxycarbonyl - 1,3 - benzodioxol - 2 - acetic acid methyl ester may likewise be used as starting material in place of 2-ethoxycarbonyl - 1,3 - benzodioxol-2-acetic acid ethyl ester.

(h) 1'-benzylspiro[1,3-benzodioxol-2,3'-pyrrolidine]

100 cc. of ether are added to a suspension of 8 g. of lithium aluminum hydride in 100 cc. of benzene and a solution of 15 g. of 1'-benzylspiro[1,3 - benzodioxol - 2,3'-pyrrolidine] 2',5'-dione in 150 cc. of benzene is subsequently added dropwise while cooling. The mixture is stirred at 40° (bath temperature) for 24 hours, a small amount of water is subsequently added dropwise and filtration is effected; the filtrate is dried over sodium sulphate and concentrated by evaporation. The oil obtained as residue is taken up in methanol and a solution of 5.2 g. of maleic acid in a small amount of methanol is added. Ether is added to the resulting solution until crystallization commences, whereupon the hydrogen maleate of the title compound precipitates and is filtered off. M.P. 152–153°.

(i) 1'-benzylspiro[1,3-benzodioxol-2,3'-pyrrolidine]

8.6 g. of 2-(2-bromoethyl - 2 - bromomethyl-1,3-benzodioxol and 30 cc. of benzylamine are heated to 120° for 6 hours. After cooling the reaction mixture is shaken with water and chloroform. The chloroform layer is separated, dried over sodium sulphate, filtered and concentrated by evaporation in a vacuum. The resulting oil is distilled in a vacuum, whereby the title compound distills at 159–163°/0.25 mm. of Hg; its hydrogen maleate has a M.P. of 152–153° after crystallization from ethanol.

EXAMPLE 3

Galenic preparation: capsules

|  | G. |
|---|---|
| Spiro[1,3 - benzodioxol - 2,3' - pyrrolidine] hydrochloride | [1] 0.01206 |
| Tartaric acid | 0.024 |
| Lactose | 0.25394 |
| Content of capsule | 0.290 |
| Cover, about | 0.080 |
| For a capsule of about | 0.370 |

[1] Corresponds to 0.010 g. of base.

Spiro[1,3 - benzodioxol - 2,3' - pyrrolidine] hydrochloride, tartaric acid and lactose are mixed; the mixture is automatically filled into hard gelatine capsules.

What is claimed is:

1. Spiro[1,3-benzodioxol-2,3'-pyrrolidine] of the formula:

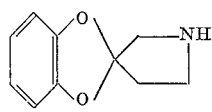

or a pharmaceutically acceptable acid addition salt thereof.

2. 1'-benzylspiro[1,3 - benzodioxol - 2,3' - pyrrolidine] of the formula:

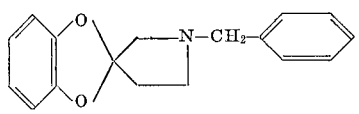

3. 1'-benzylspiro[1,3 - benzodioxol - 2,3' - pyrrolidine]-2',5'-dione of the formula:

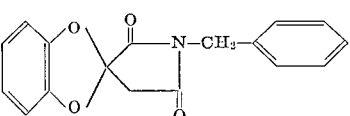

References Cited

UNITED STATES PATENTS 3,170,932  2/1965  Jucker et al.

ALEX MAZEL, Primary Examiner

J. A. NARCAVAGE, Assistant Examiner

U.S. Cl. X.R.

260—340.5; 424—274